(12) United States Patent
Chen et al.

(10) Patent No.: US 12,040,715 B2
(45) Date of Patent: Jul. 16, 2024

(54) VOLTAGE CONVERTER WITH LOOP CONTROL

(71) Applicant: TEXAS INSTRUMENTS INCORPORATED, Dallas, TX (US)

(72) Inventors: Biao Chen, Shenzhen (CN); Jiancong Ruan, Shenzhen (CN); Runqin Tan, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/311,411

(22) Filed: May 3, 2023

(65) Prior Publication Data

US 2023/0275513 A1 Aug. 31, 2023

Related U.S. Application Data

(63) Continuation of application No. 17/130,745, filed on Dec. 22, 2020, now Pat. No. 11,677,324.

(51) Int. Cl.
*H02M 3/158* (2006.01)
*H02M 1/15* (2006.01)

(52) U.S. Cl.
CPC .......... *H02M 3/1584* (2013.01); *H02M 1/15* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS

| 7,230,406 B2 | 6/2007 | Huang |
| 9,148,917 B2 | 9/2015 | Omi |

(Continued)

*Primary Examiner* — Jeffrey A Gblende
(74) *Attorney, Agent, or Firm* — Ray A. King; Frank D. Cimino

(57) ABSTRACT

A converter system includes a switch adapted to be coupled to an inductor, and configured to switch between first and second states responsive to a loop control signal. Calibration circuitry is configured to operate in first and second control modes, provide a calibration voltage in the first control mode, and store the calibration voltage in the second control mode. In a first instance of the first control mode, the calibration voltage is based on a difference between a feedback voltage and a reference voltage. In a second instance of the first control mode, the calibration voltage is the stored calibration voltage from the second control mode. A comparator is coupled to the switch and the calibration unit, and is configured to provide the loop control signal based on a combination of at least the feedback voltage, the reference voltage, the calibration voltage, and a periodic signal.

10 Claims, 9 Drawing Sheets

(58) Field of Classification Search
CPC ...... H02M 3/156; H02M 3/157; H02M 3/158; H02M 3/1588; H02M 2003/1566; H02M 3/1582; H02M 3/1584; H02M 2003/1557; H05B 39/048; B23K 11/24; H04B 2215/069

See application file for complete search history.

(56) References Cited

U.S. PATENT DOCUMENTS

| | | | |
|---|---|---|---|
| 9,553,513 B2 * | 1/2017 | Xu | H02M 3/156 |
| 10,056,830 B2 * | 8/2018 | Hu | H02M 3/156 |
| 2007/0001655 A1 | 1/2007 | Schiff | |

* cited by examiner

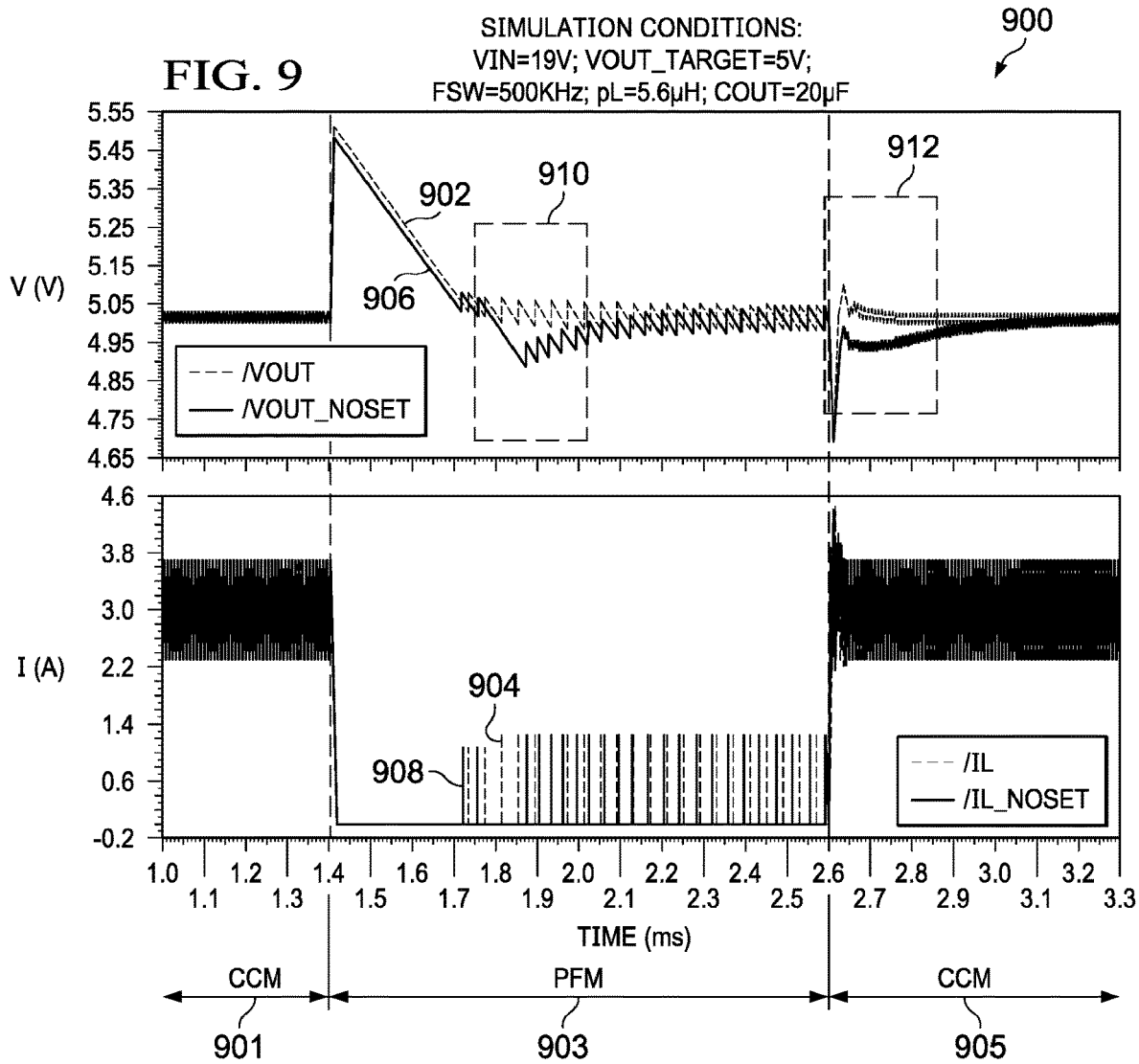

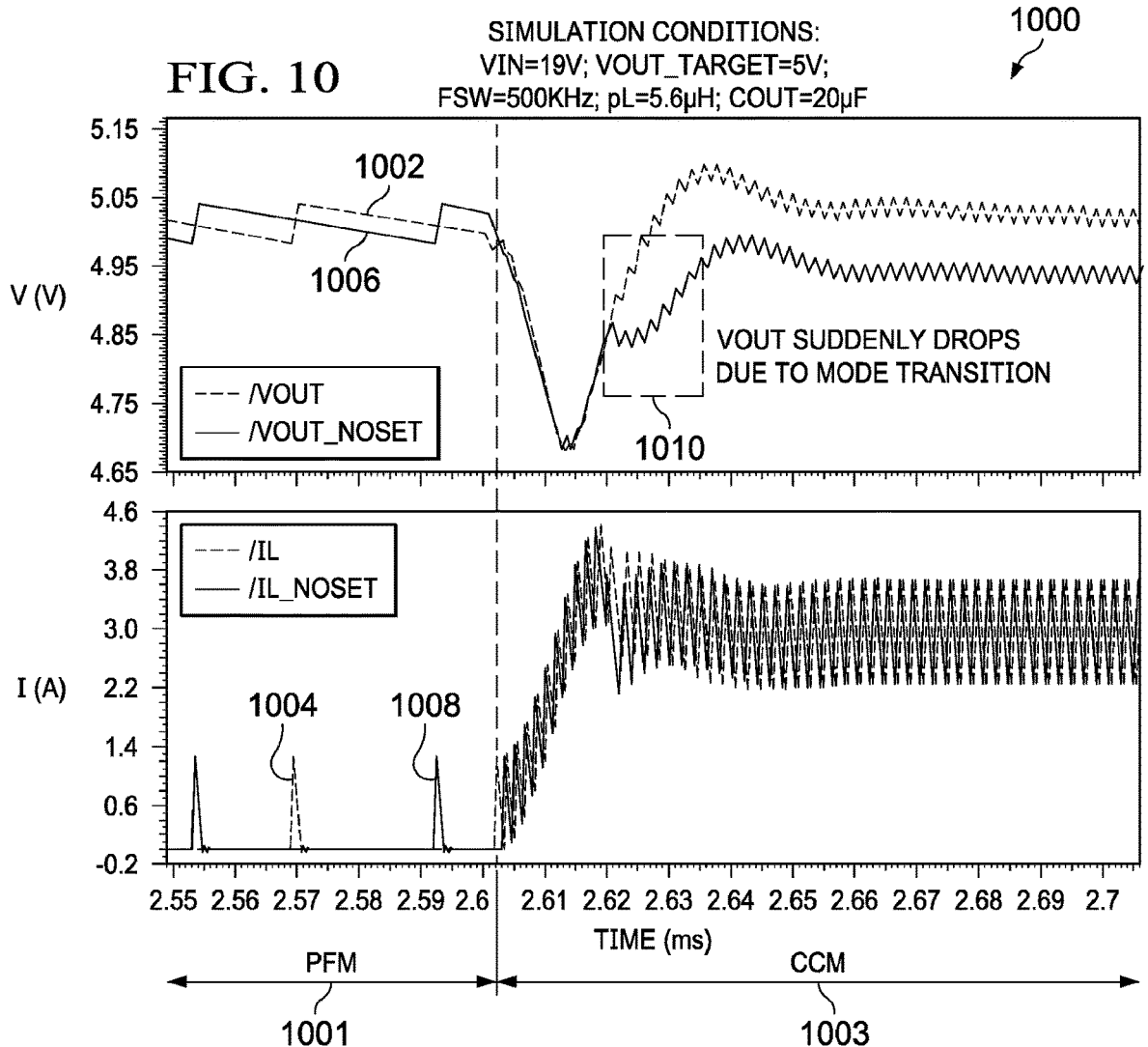

VOLTAGE CONVERTER WITH LOOP CONTROL

CROSS-REFERENCE TO RELATED APPLICATIONS

This application is a continuation of U.S. patent application Ser. No. 17/130,745 filed on Dec. 22, 2020, which is hereby incorporated herein by reference.

TECHNICAL FIELD

This description relates generally to integrated circuits, and more particularly to a voltage converter system with ripple-based loop control.

BACKGROUND

DC-DC voltage converters are useful to convert an input DC voltage to a desired output DC voltage to drive a load. A DC-DC converter with loop control may include a switch coupled to a switch terminal of the DC-DC converter, a feedback loop that generates a ripple signal in phase with an inductor current flowing through an inductor coupled to the switch terminal of the DC-DC converter, and a control circuit that determines on or off time of the switch in each switching cycle based on a combination of the ripple signal and a feedback voltage of the output DC voltage, thereby regulating the output voltage.

In one control paradigm, the switch is switched between on and off states based on a peak value of the combination of the ripple signal and the feedback voltage. In another control paradigm, the switch is switched between the on and off states based on a valley value of the combination of the ripple signal and the feedback voltage.

SUMMARY

A converter system includes a switch adapted to be coupled to an inductor, and configured to switch between first and second states responsive to a loop control signal. Calibration circuitry is configured to operate in first and second control modes, provide a calibration voltage in the first control mode, and store the calibration voltage in the second control mode. In a first instance of the first control mode, the calibration voltage is based on a difference between a feedback voltage and a reference voltage. In a second instance of the first control mode, the calibration voltage is the stored calibration voltage from the second control mode. A comparator is coupled to the switch and the calibration unit, and is configured to provide the loop control signal based on a combination of at least the feedback voltage, the reference voltage, the calibration voltage, and a periodic signal.

BRIEF DESCRIPTION OF THE DRAWINGS

FIG. 9 is a diagram of simulation waveforms of mode transition of converter systems with and without setting integrators of the calibration circuitry of FIG. 2.

FIG. 10 is a partially enlarged diagram of simulation waveforms FIG. 9.

DETAILED DESCRIPTION OF EXAMPLE EMBODIMENTS

This description relates to converter systems with loop control.

Figure 1A:
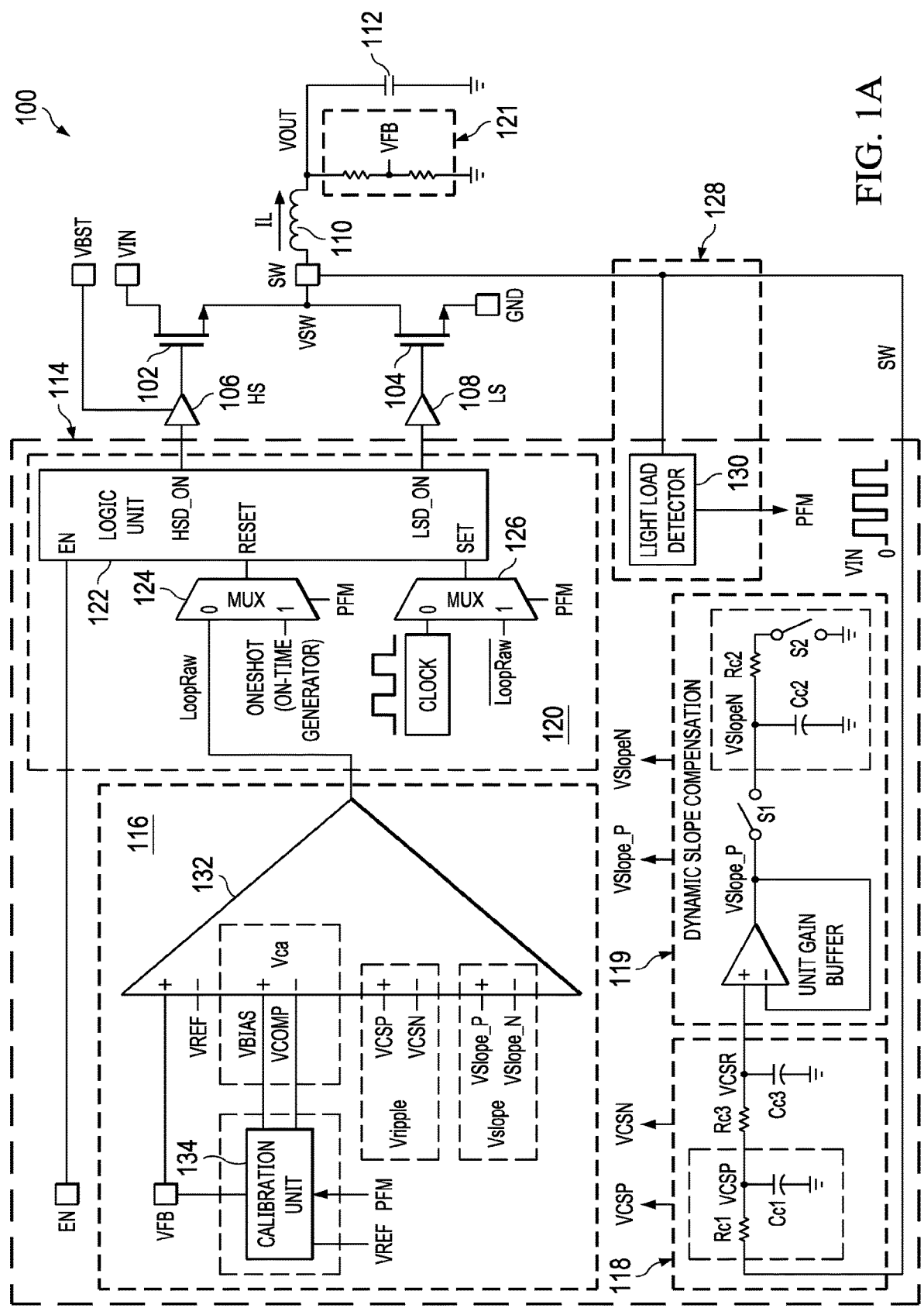
FIG. 1A is a schematic block diagram of a converter system in accordance with an implementation of this description.

FIG. 1A is a schematic block diagram of a converter system 100 in accordance with an implementation of this description. More particularly, FIG. 1A shows a buck converter system configured to operate in: (a) a first control mode, such as peak-ripple-based continuous conduction mode (CCM); and (b) a second control mode, such as valley-ripple-based pulse frequency modulation (PFM) mode.

The converter system 100 includes an input terminal VIN configured to receive an input voltage Vin, and an output terminal VOUT at which the converter system 100 is configured to provide an output voltage Vout. The converter system 100 includes: (a) a first switch 102 coupled between a switch terminal SW and the input terminal VIN of the converter system 100, thereby allowing a current flowing from the input terminal VIN to the switch terminal SW when the first switch 102 is on; and (b) a second switch 104 coupled between the switch terminal SW and a voltage supply terminal, such as a ground terminal GND. The first and second switches 102 and 104, also named respectively as high side and low side switches, can be transistors, such as N-channel metal oxide semiconductor field effect transistors (MOSFETs), which are respectively controlled by gate drive signals LSD_ON and HSD_ON respectively received from a high side driver HS 106 and a low side drive LS 108, to alternately operate in first and second states, e.g. on and off states, thereby allowing a current to follow from the input terminal VIN to the switch terminal SW towards the output terminal VOUT of the converter system 100, and from the ground terminal GND to switch terminal SW towards an output terminal VOUT. The converter system 100 also includes an output inductor 110 coupled between the switch terminal SW and the output terminal VOUT, and an output capacitor 112 coupled between the output terminal VOUT and the ground terminal GND.

The system 100 includes a control circuit 114 coupled to the high side and low side drivers 106 and 108 to provide the gate drive signals HSD_ON and LSD_ON. In one example, the high side and low side drivers 106 and 108 can be either integral with or separate from the control circuit 114.

The control circuit 114 includes loop control circuitry 116 configured to generate a loop control signal LoopRaw based on a feedback voltage VFB proportional to an output voltage VOUT of the converter system 100, and a periodic signal, such as a ripple signal representative of an inductor current IL of the output inductor 110. In one example, the control circuit 114 includes a ripple signal generator 118 configured to provide the ripple signal Vripple in phase with the inductor current IL based on a voltage VSW at the switch terminal SW. The ripple signal Vripple is a combination of output voltage signals VCSP and VCSN generated by the ripple signal generator 118, such as Vripple=VCSP−VCSN. To generate the loop control signal LoopRaw, the ripple signal Vripple is added to the feedback voltage VFB, and a sum of the ripple signal Vripple and the feedback voltage VFB is compared with a reference voltage VREF.

In another example, the control circuit 114 includes a slope signal generator 119 configured to provide a slope signal Vslope to be compensated to the ripple signal Vripple, wherein Vslope=VSlope_P−VSlope_N. The slope signal Vslope may be optional but can help to mitigate sub-harmonic oscillation issue of the converter system 100, especially particularly when the converter system 100 operates at a duty cycle greater than 50%, where the sum of the ripple signal Vripple and the feedback voltage VFB may not have sufficient time to return to zero.

Figure 1B:
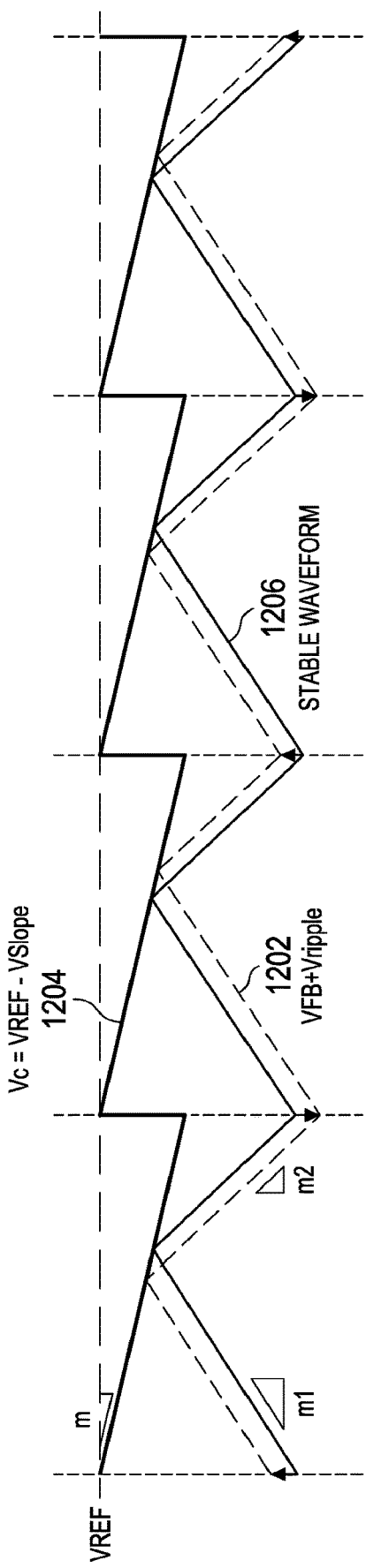
FIG. 1B shows illustrative waveforms of slope compensation of the converter system of FIG. 1A.

FIG. 1B shows illustrative waveforms of how the slope signal Vslope compensates the ripple signal Vripple to mitigate sub-harmonic oscillation. A sum 1202 of the ripple signal Vripple and the feedback voltage VFB is compared with a compensated voltage Vc 1204, where Vc=VREF−Vslope. Preferably, considering all duty cycle applications, a falling slope m of the compensated voltage Vc 1204 and a falling slope m2 of the sum 1202 of the ripple signal Vripple and the feedback voltage VFB satisfies:

$$m=k*m2 \qquad (1)$$

where k is preferred to be greater than 0.5.

By the dynamic slope compensation, the waveform of the sum 202 of the ripple signal Vripple and the feedback voltage VFB can be near a desired stable waveform 1206, so the sub-harmonic oscillation issue can be mitigated.

In one example, the switches S1 and S2 of the slope signal generator 119 are controlled based on the status of the high side and low side switches 102 and 104. For example, in CCM: (a) when the high side switch 102 is switched off and the low side switch 104 is switched on, the switch S1 is switched on, the switch S2 is switched off, a capacitor Cc2 is charged until VSlope_N reaches VCSN, and slope compensation is disabled; and (b) when the high side switch 102 is switched on and the low side switch 104 is switched off, the switch S1 is switched off, the switch S2 is switched on, the capacitor Cc2 is discharged by Rc2, VSlope_N drops from VCSN, and slope compensation is enabled. The falling slope m of the compensation voltage Vc 1204 depends on the resistor Rc2 and VCSN. The slope compensation signal is combined with the reference voltage VREF.

The falling slope m of the compensated voltage Vc 1204 is configured to dynamically track the falling slope m2 of the sum 1202 of the ripple signal Vripple and the feedback voltage VFB based on equation (1). A ratio k of the falling slope m to the falling slope m2 remains constant and is independent of the input and output voltages Vin and Vout, duty cycle and process of the DC-DC converter system 100, and other environmental factors (such as temperature etc.).

Referring again to FIG. 1A, as the ripple voltage Vripple is generated based on resistor Rc1 and capacitor Cc1 of the ripple signal generator 118, the falling slope m2 of the sum 202 can be derived based on the resistor Rc1 and the capacitor Cc1. The falling slope m of the compensated voltage 304 is determined based on the falling slope m2.

The ratio k is configured by configuring the ratio between Rc1 and Rc2 and/or the ratio between VCSN and VSlope_P. Assuming Cc1=Cc2=Cc, the falling slope m depends on Rc2 and VCSN, when Rc1=Rc2=Rc and VCSN=VSlope_P, and k=1. In other examples: (a) if Rc2=0.5Rc1 and VCSN=VSlope_P, then m=2*m2; or (b) if Rc1=Rc2=Rc and VSlope_P=2*VCSN, then m=2*m2.

In one example, the feedback voltage VFB is generated by a voltage feedback unit 121 coupled to the output terminal VOUT. The voltage feedback unit 121 including a voltage divider can be either integral with or separate from the converter system 100.

The control circuit 114 includes logic control circuitry 120 configured to generate the high side and low side drive signals HSD_ON and LSD_ON, based on the loop control signal LoopRaw. In one example, the logic control circuitry 120 includes a logic unit 122, a first multiplexer 124 having an output terminal coupled to a reset terminal of the logic unit 122, and a second multiplexer 126 having an output terminal coupled to a set terminal of the logic unit 122. In one example, the logic unit 122 is an SR flip-flop configured to: (a) assert the high side drive signal HSD_ON to turn on the first switch 102 responsive to receiving a logic high signal from the second multiplexer 126; and (b) de-assert the high side drive signal HSD_ON to turn off the first switch 102 responsive to receiving a logic high signal from the first multiplexer 124. The logic unit 122 is configured to generate the low side drive signal LSD_ON complementary with the high side drive signal HSD_ON. In one example, a gap time is preferably provided between: switching off one of the first and second switches 102 and 104; and switching on the other one of the first and second switches 102 and 104.

The first and second multiplexers 124 and 126 have respective control terminals configured to receive a mode control signal PFM, which is provided based on load condition of the converter system 100. In one example, in a normal load condition, the mode control signal PFM is reset to logic low, so the converter system 100 is configured to operate in the first control mode, such as peak-ripple-based continuous conduction mode (CCM). In the first control mode, the logic control circuitry 120 is configured to: (a) switch on the high side switch 102 based on a first arrival of a clock signal CLOCK with a target frequency; and (b) switch off the high side switch 102 responsive to the loop control signal LoopRaw being asserted to logic high.

In a light load condition, the mode control signal PFM is set to logic high, so the converter system 100 is configured to operate in the second control mode, such as valley-ripple-based pulse frequency modulation (PFM) mode. In the second control mode, the logic control circuitry 120 is configured to: (a) switch on the high side switch 102 responsive to the loop control signal LoopRaw being de-asserted to logic low; and (b) switch off the high side switch 102 after a particular time defined by a one-shot signal Oneshot generated by an on-time generator (not shown), which is configured to generate the one-shot signal Oneshot the particular time after the inverted LoopRaw signal, /LoopRaw, is asserted. In the example of FIG. 1A, the LoopRaw signal LoopRaw is generated based on a difference between the reference voltage VREF and a combination of the feedback voltage VFB, the ripple voltage Vripple and the slope voltage Vslope.

In one example, the converter system 100 includes mode control circuitry 128 configured to determine the light load condition by sensing the inductor current IL and to generate the mode control signal PFM. In one example, the mode control circuitry 128 is configured to sense the inductor current IL by sensing the voltage VSW at the switch terminal SW. The light load condition occurs if the inductor current IL flows from the output terminal VOUT towards the switch terminal SW when the second switch 104 is switched on. In one example, the mode control circuitry 128 includes a light load detector 130 configured to assert the mode control signal PFM to logic high responsive to detecting the voltage VSW is greater than zero when the second switch 104 is switched on.

The loop control circuitry 116 includes a first comparator 132 configured to generate the loop control signal LoopRaw based on a combination of a difference between the feedback voltage VFB and a reference voltage VREF, the ripple signal Vripple, the slope signal Vslope and a calibration voltage Vca. In one example, the first comparator 132 includes: a first non-inverting input terminal configured to receive the feedback voltage VFB; and a first inverting input terminal configured to receive the reference voltage VREF. The loop control circuitry 116 also includes a calibration circuitry 134 configured to provide the calibration voltage Vca based on the feedback voltage VFB, the reference voltage VREF and the mode control signal PFM. In one example, the calibration circuitry 134 is configured to, based on the mode control signal PFM, provide: a first calibration voltage when the converter system 100 operates in the first control mode; and a second calibration voltage when the converter system 100 operates in the second control mode. In the example shown in FIG. 1A, VFB, VREF, VCSP, VCSN, VSlope_P and VSlope_N are provided to respective inputs of the first comparator 132.

In one example, the calibration voltage Vca is a voltage difference between first and second output terminals of the calibration circuitry 134. In one example, a voltage Vcomp at the first output terminal is generated by integrating a difference between the feedback voltage VFB and the reference voltage VREF, and a bias voltage Vbias is provided at the second output terminal. In another example, the calibration circuitry 134 is also configured to: store (in the second control mode) the voltage Vcomp that was generated in the first control mode; and provide the stored voltage Vcomp as the first output signal of the calibration circuitry 134, when the converter system 100 is switched back to the first control mode from the second control mode. In one example, the calibration voltage Vca is provided by the equation (2) below:

$$Vca = Vcomp - Vbias \quad (2)$$

The first output terminal of the calibration circuitry 134 is coupled to a second inverting input terminal of the first comparator 132, and the second output terminal of the calibration circuitry 134 is coupled to a second non-inverting input terminal of the first comparator 132, such that the calibration voltage Vca is added to the reference voltage VREF by operation of the first comparator 132. The ripple voltage Vripple and the slope voltage Vslope are provided to add to the feedback voltage VFB. The first comparator 132 is configured to generate the loop control signal LoopRaw based on a difference between a sum of the feedback voltage VFB and the ripple voltage Vripple, and the slope voltage Vslope and a sum of the reference voltage VREF and the calibration voltage Vca.

Figure 2:
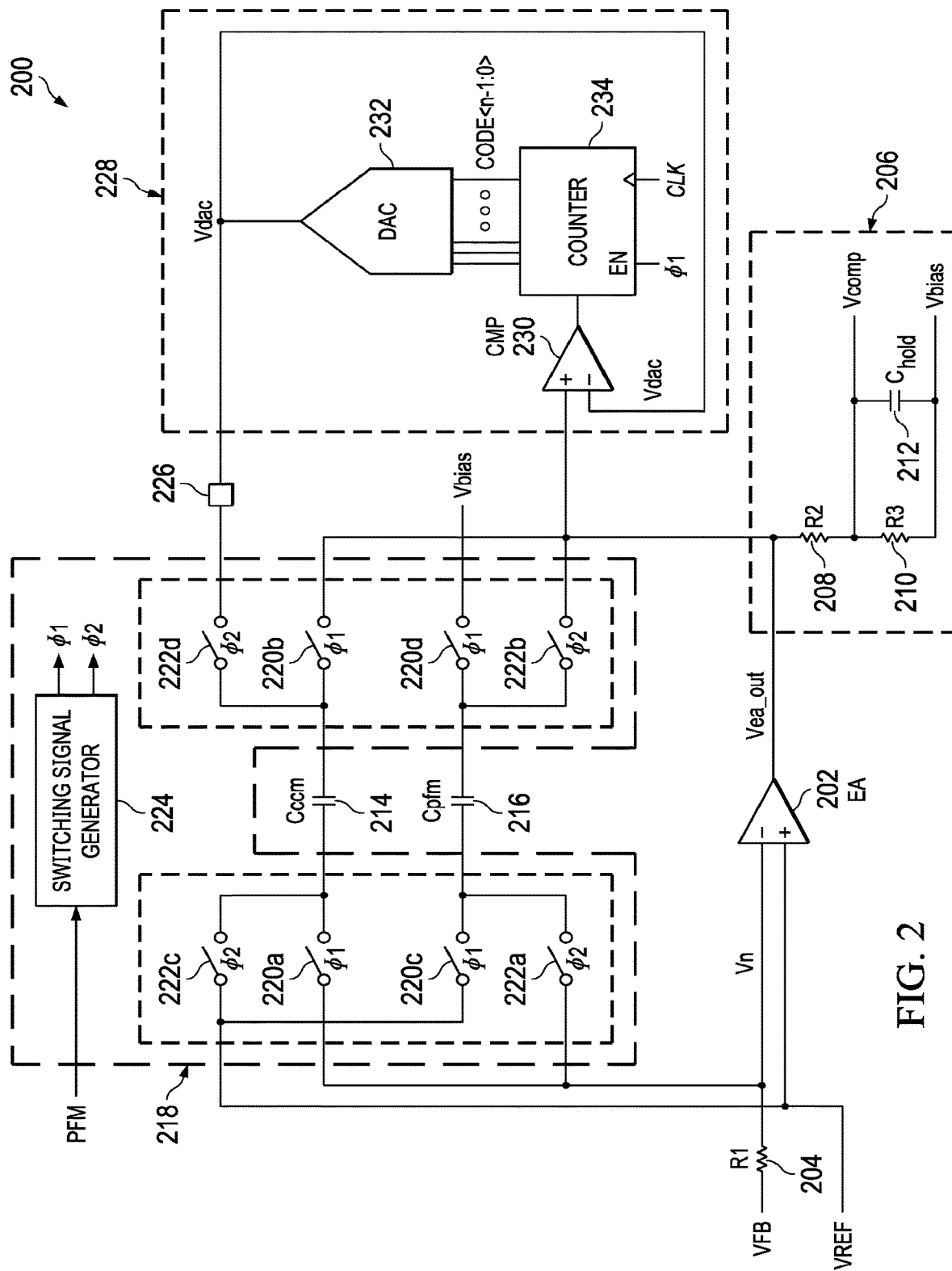
FIG. 2 is a schematic circuit diagram of calibration circuitry in accordance with an implementation of this description.

FIG. 2 is a schematic circuit diagram of calibration circuitry 200 in accordance with an implementation of this description. In one example, the calibration circuitry 200 of FIG. 2 is an example of the calibration circuitry 134 of FIG. 1A.

The calibration circuitry 200 includes an error amplifier 202 having: (a) a first input terminal, such as an inverting input terminal, configured to receive the feedback voltage VFB through a first resistor 204 having a resistance of R1; (b) a second input terminal, such as a non-inverting input terminal, configured to receive the reference voltage VREF; and (c) an output terminal configured to provide an error amplifier output voltage Vea_out. Also, the calibration unit 200 includes calibration voltage output circuitry 206 coupled to the output terminal of the error amplifier 202, and configured to provide the calibration voltage Vca based on the error amplifier output voltage Vea_out. In one example, the calibration voltage output circuitry 206 includes: a second resistor 208 having a resistance of R2 and coupled between the output terminal of the error amplifier 202 and the first output terminal that provides the voltage Vcomp; a third resistor 210 having a resistance of R3 and coupled in series between the first output terminal and the second output terminal that is set to the bias voltage Vbias; and a hold capacitor 212 having a capacitance of $C_{hold}$ and coupled in parallel with the third resistor 210. The bias voltage Vbias can be provided at a first bias voltage terminal of circuitry integral with or separate from the integrator 200. Vbias value may be set to a constant voltage, such as 2.5V. The voltage Vcomp is proportional to the error amplifier output voltage Vea_out.

The calibration circuitry 200 also includes a first capacitor 214 having a capacitance of Cccm, a second capacitor 216 having a capacitance of Cpfm, and switching circuitry 218 configured to alternately couple one of the first and second capacitors 214 and 216 in parallel with the error amplifier 202 based on the mode control signal PFM to integrate the difference between the feedback voltage VFB and the reference voltage VREF in a corresponding control mode.

The switching circuitry 218 includes: a first set of switches 220a through 220d controlled by a first switching signal Φ1; and a second set of switches 222a through 222d controlled by a second switching signal Φ2; and a switching signal generator 224 configured to generate the first and second switching signals Φ1 and Φ2 based on the mode control signal PFM. In one example, the first set of switches 220a through 220d are switched on and off complementarily (or complementarily but with a gap time therebetween) with the second set of switches 222a through 222d.

In one example, when the mode control signal PFM is logic low, e.g., when the converter system 100 operates in the first control mode: (a) the second set of switches 222a through 222d are switched off; (b) the switches 220a and 220b of the first set are switched on to couple the first capacitor 214 between the first input terminal of the error amplifier 202 and the output terminal of the error amplifier 202, in order to form a first integrator including the first capacitor 214, the error amplifier 202 and the first resistor 204. The first integrator is configured to integrate the voltage difference between the feedback voltage VFB and the reference voltage VREF, so the error amplifier output voltage Vea_out ramps over a first period of time (which is based on the resistance R1 of the first resistor 204 and the capacitance Cccm of the first capacitor 214); and (c) the switches 220c and 220d of the first set are switched on to couple the second capacitor 216 between the second input terminal of the error amplifier 202 and the first bias voltage terminal to set a voltage across the second capacitor Cpfm.

When the mode control signal PFM is logic high, e.g., when the converter system 100 operates in the second control mode: (a) the first set of switches 220a through 220d are switched off; (b) the switches 222a and 222b of the second set are switched on to couple the second capacitor 216 between the first input terminal of the error amplifier 202 and the output terminal of the error amplifier 202, in order to form a second integrator including the second capacitor 216, the error amplifier 202 and the first resistor 204. The second integrator is configured to integrate the voltage difference between the feedback voltage VFB and the reference voltage VREF, so the error amplifier output voltage Vea_out ramps over a second period of time (which is based on the resistance R1 of the first resistor 204 and the capacitance Cpfm of the second capacitor 216); and (c) the switches 222c and 222d of the second set are switched on to couple the first capacitor 214 between the second input terminal of the error amplifier 202 and a second bias voltage terminal 226 to set a voltage across the first capacitor Cccm. In one example, the first switching signal Φ1 is complementary with the mode control signal PFM, and the second switching signal Φ2 is same as the mode control signal PFM. In another example, a gap time is provided between logic-high periods of the first and second switching signals Φ1 and Φ2.

Figure 3B:
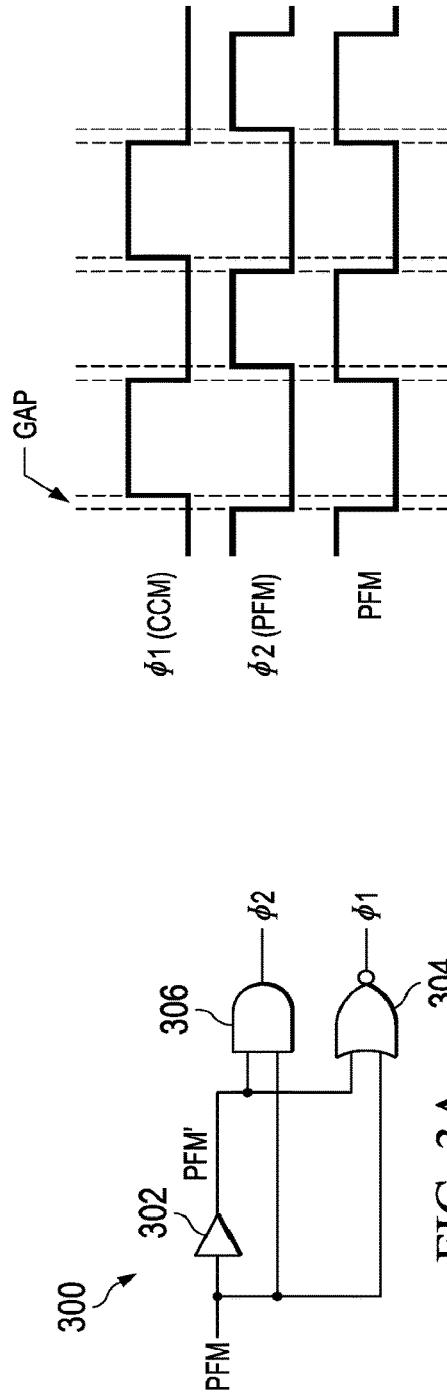
FIG. 3B is an illustrative timing diagram of switching signals generated by the switching signal generator of FIG. 3A in accordance with an implementation of this description.
Figure 3A:
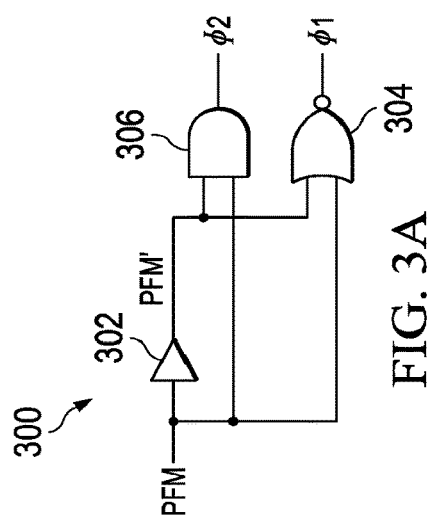
FIG. 3A is a schematic circuit diagram of a switching signal generator in accordance with an implementation of this description.

FIG. 3A is a schematic circuit diagram of a switching signal generator 300 in accordance with an implementation of this description. In one example, the switching signal generator 300 of FIG. 3A is an example of the switching signal generator 224 of FIG. 2.

The switching signal generator 300 includes: (a) a delay element 302 configured to generate a delayed mode control signal PFM'; (b) a NOR gate 304 configured to receive the delayed mode control signal PFM' and the mode control signal PFM and to generate the first switching signal Φ1 having a rising edge delayed from a falling edge of the mode control signal PFM; and (c) an AND gate 306 configured to receive the delayed mode control signal PFM' and the mode control signal PFM and to generate the second switching signal Φ2 having a rising edge delayed from a rising edge of the mode control signal PFM. Therefore, a gap time is provided between logic-high periods of the first and second switching signals Φ1 and Φ2. An example timing diagram of the first and second switching signals Φ1 and Φ2, and the mode control signal PFM is shown in FIG. 3B.

Referring again to FIG. 2, in one example, the second bias voltage terminal provides the bias voltage Vbias. In another example, the calibration circuitry 200 includes a successive-approximation-register (SAR) digital-to-analog converter (DAC) 228 coupled between the output terminal of the error amplifier 202 and the second bias voltage terminal 226, and configured to generate a sampled voltage Vdac by sampling the error amplifier output voltage Vea_out when the converter system 100 is in the first control mode, and store the sampled voltage Vdac to the first capacitor 214 through the switch 12 when the converter system 100 is in the second control mode. Accordingly, when the converter system 100 is switched back from the second control mode to a next first control mode, the sampled voltage Vdac is provided at the output terminal Vea_out to generate the calibration voltage Vca with shortened mode transition period.

The SAR DAC 228 includes: (a) a second comparator 230 having a first input terminal (e.g., a non-inverting input terminal) coupled to the output terminal of the error amplifier 202; and (b) a DAC 232 having an output terminal coupled to an inverting input terminal of the second comparator 230. The SAR DAC 228 also includes an n-bit counter 232 (n is an integer greater than 0) having: a data input terminal coupled to an output terminal of the second comparator 230; a clock terminal configured to receive a counter clock signal CLK; n-bit output terminals coupled to digital input terminals of the DAC; and an enable terminal configured to receive the first switching signal Φ1, such that the counter 234 of the SAR DAC 228 is only enabled when the first capacitor 214 is coupled to perform integration. In one example, a period of the counter clock signal CLK is slightly larger than a loop delay caused by the error amplifier 202 and the second comparator 230 to ensure the stability of the converter system 100.

Figure 4:
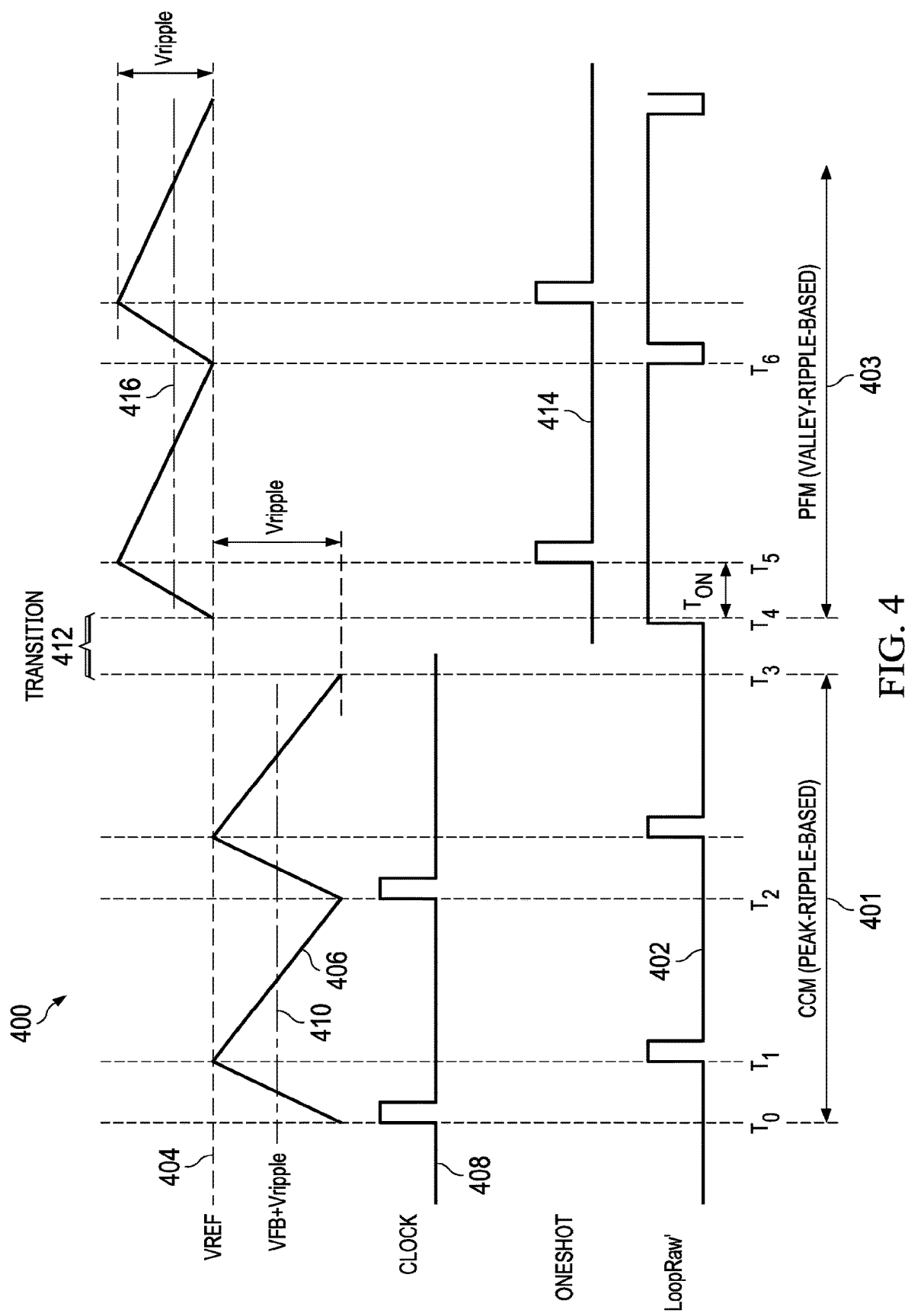
FIG. 4 is an illustrative diagram of waveforms of a converter operating between peak-ripple-based continuous conduction mode (CCM) and valley-ripple-based pulse frequency modulation (PFM) mode without output voltage calibration.

FIG. 4 is an illustrative diagram 400 of waveforms of a converter operating between peak-ripple-based continuous conduction mode (CCM) 401 and valley-ripple-based pulse frequency modulation (PFM) mode 403 without output voltage calibration.

A converter without output voltage calibration may include a comparator that generates a loop control signal LoopRaw' 402 based on a difference between the reference voltage VREF 404 and a combination signal VFB+Vripple+Vslope 406 of the feedback voltage VFB and the ripple voltage Vripple and the slope voltage Vslope. As shown in FIG. 4, starting from T0, the converter operates in the peak-ripple-based continuous conduction mode (CCM) 401. At T0, the second switch, e.g., the low side switch, of the converter is switched off, and the first switch, e.g., the high side switch, of the converter is switched on responsive to an arrival of logic-high of the clock signal 408, which causes the ripple signal Vripple to increase. At T1, the combination signal VFB+Vripple+Vslope 406 increases to the reference voltage VREF 404, which causes the comparator to assert the loop control signal LoopRaw' 402. The high side switch is switched off, and the low side switch is switched on, based on a logic-high signal of the loop control signal LoopRaw' 402, which causes the combination signal VFB+Vripple+Vslope 406 to decrease. At T2, the high side switch is then switched on again responsive to a next arrival of logic-high of the clock signal 408. As shown in FIG. 4, without output voltage calibration, due to the peak-ripple-based control, the average level 410 of the feedback voltage VFB in the peak-ripple-based CCM remains lower than the reference voltage VREF 404 by half of an amplitude of the sum of the ripple signal Vripple and the slope signal Vslope.

Responsive to detecting a light load of the converter, the converter operates in the valley-ripple-based pulse frequency modulation (PFM) mode 403 after a transition period 412 between T3 and T4. In the valley-ripple-based PFM, the high side switch is switched off, and the low side switch is switched on, at T5 by a one-shot signal 414 asserted an on-time Ton after the high side switch is switched on, which causes the combination signal VFB+Vripple+Vslope 406 to decrease. At T6, the combination signal VFB+Vripple+Vslope 406 decreases to the reference voltage VREF 404, which de-asserts the loop control signal LoopRaw' 402 to logic low, thereby switching on the high side switch again. As shown in FIG. 4, without output voltage calibration, due to the valley-ripple-based control, the average level 416 of the feedback voltage VFB in the valley-ripple-based CCM remains higher than the reference voltage VREF 404 by half of the amplitude of the sum of the ripple signal Vripple and the slope signal Vslope.

Figure 5:
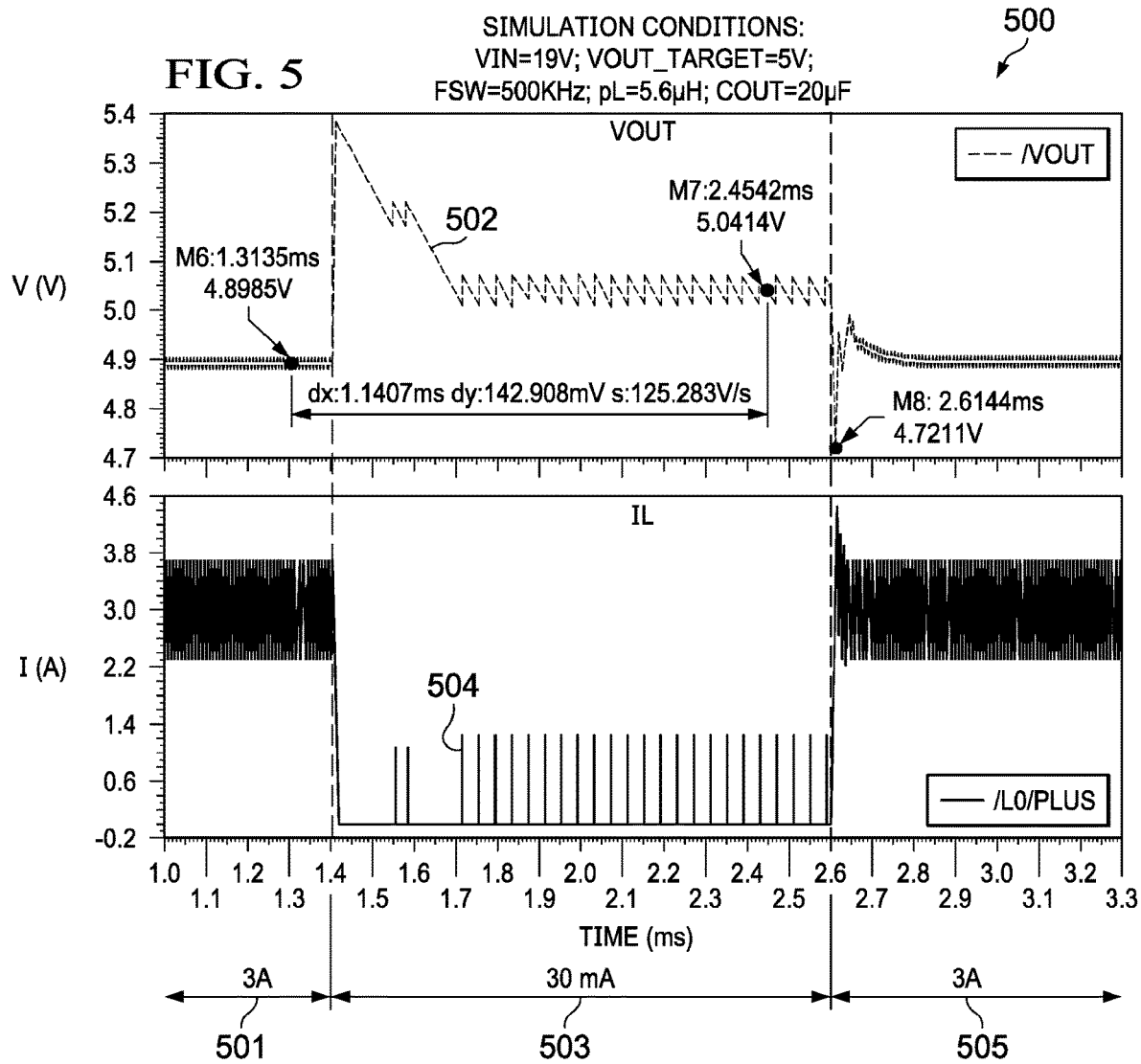
FIG. 5 is a diagram of simulation waveforms of a converter operating in peak-ripple-based continuous conduction mode (CCM) and valley-ripple-based pulse frequency modulation (PFM) mode without output voltage calibration.

FIG. 5 is a diagram 500 of simulation waveforms of a converter without output voltage calibration. The converter has a target output voltage 5V and operates between peak-ripple-based continuous conduction mode (CCM) and valley-ripple-based pulse frequency modulation (PFM) mode. The converter operates: in peak-ripple-based CCM in period 501 with an average inductor current IL 504 of 3A; in valley-ripple-based PFM in period 503 with an average inductor current IL 504 of 30 mA; and back in the peak-ripple-based CCM in period 505. With reference to FIG. 4 described above, due to the half Vripple+Vslope shift between the average value of the feedback voltage VFB and the reference voltage VREF (resulting from the peak-ripple-based control and valley-ripple-based control), simulation shows that: (a) in the period 501, an output voltage VOUT 502 of the converter is about 0.1V lower than the target output voltage 5V; and (b) in the period 503, the output voltage VOUT 502 is about 0.04V higher than the target output voltage 5V after the transition period.

Figure 6:
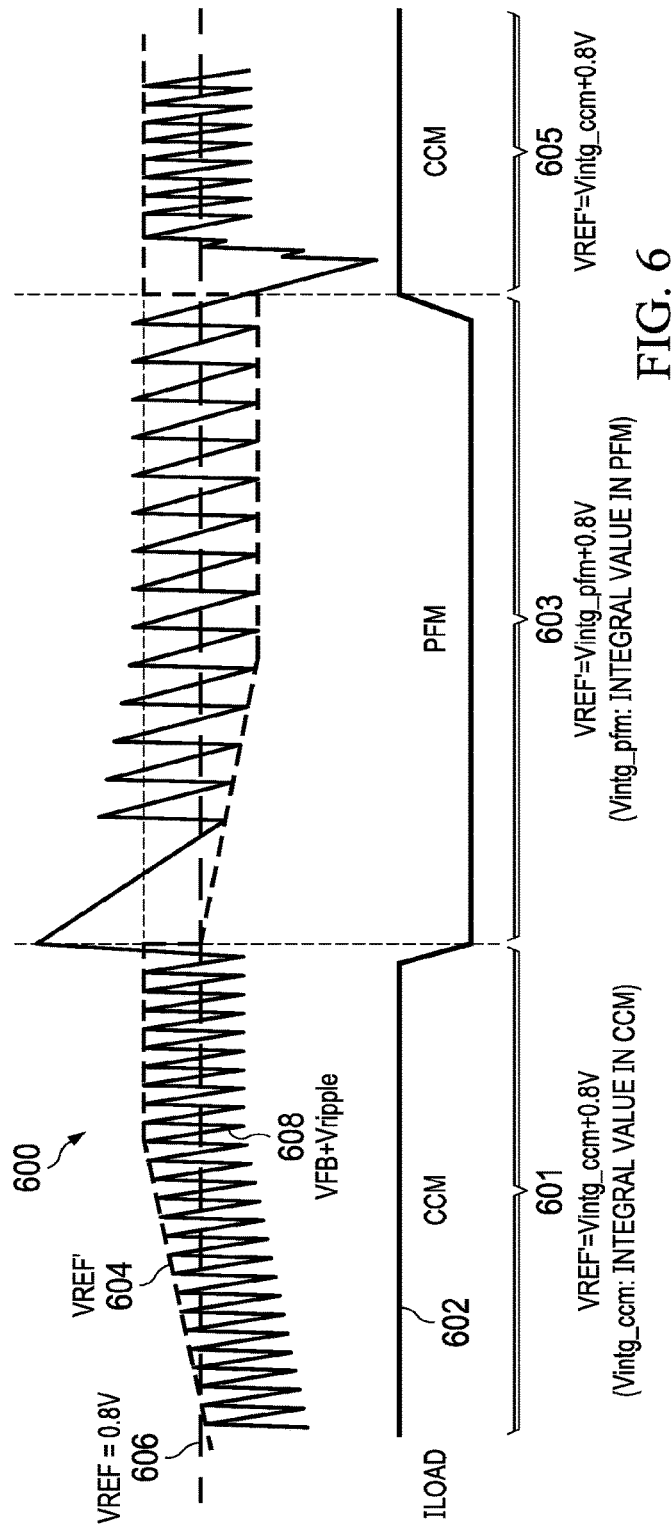
FIG. 6 is an illustrative diagram of waveforms of mode transition of the converter system of FIG. 1A in accordance with an implementation of this description.

FIG. 6 is an illustrative diagram 600 of waveforms of mode transition of the converter system 100 of FIG. 1A in accordance with an implementation of this description. Iload 602 depicts a load current through a load of the converter system 100. The converter system 100 operates between peak-ripple-based CCM and valley-ripple-based PFM based on a level of the load current Iload 602. With reference to FIGS. 1A, 1B and 2 described above, in the converter system 100, the calibration voltage Vca is added to the reference voltage VREF by operation of the first comparator 132. VREF' 604 depicts the combination of the calibration voltage Vca and the reference voltage VREF, such as VREF'=Vca+VREF. In the example shown in FIG. 6, the reference voltage VREF 606 is 0.8V. Vintg_ccm is the calibration voltage Vca generated based on Vcomp-Vbias during the integration in CCM, and Vintg_pfm is the calibration voltage Vca generated based on Vcomp-Vbias during the integration in PFM. As described with reference to FIG. 1A, in period 601, the average value of the combination signal VFB+Vripple 608 increases with the increase of VREF' resulting from the integration through the first capacitor 214 until an average value of feedback voltage VFB increases to the reference voltage VREF 606. In period 603, the average value of the combination signal VFB+Vripple 608 decreases with the decrease of VREF' resulting from the integration through the second capacitor 216 until the average value of feedback voltage VFB decreases to the reference voltage VREF 606.

With reference to FIG. 2 described above, the SAR DAC 228 generates a sampled voltage Vdac by sampling the error amplifier output voltage Vea_out in the period 601, and stores the sampled voltage Vdac with the first capacitor 214 in the period 603. When the converter system 100 is switched back from PFM to CCM, the sampled voltage Vdac is transferred to the output terminal Vea_out to generate the calibration voltage Vca to save the transition period.

Figure 7:
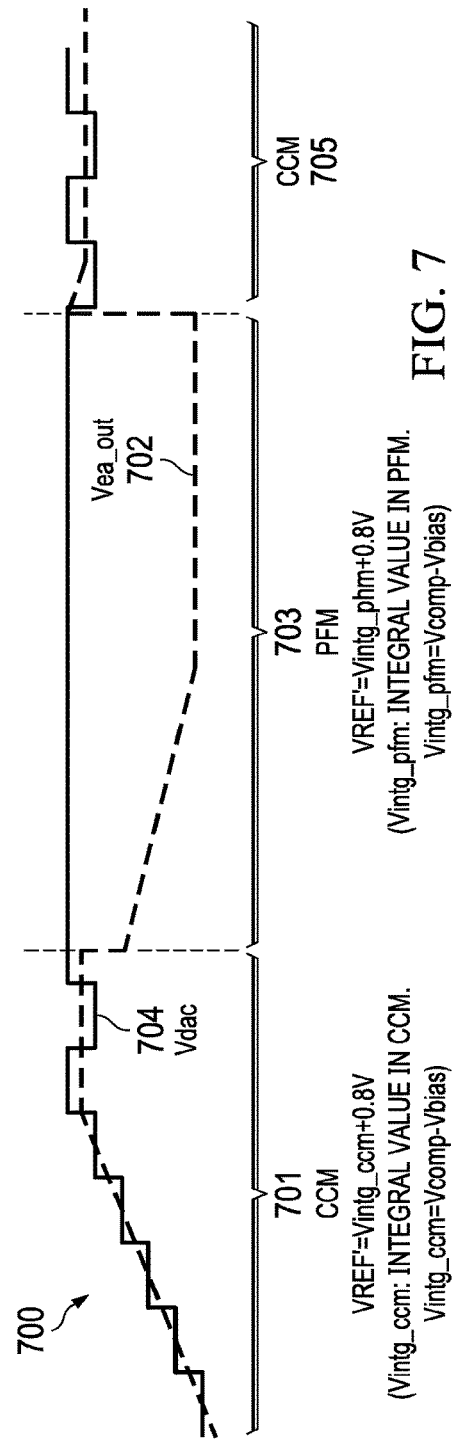
FIG. 7 is an illustrative diagram of waveforms of the calibration circuitry during mode transition of the converter system of FIG. 1A in accordance with an implementation of this description.

FIG. 7 is an illustrative diagram 700 of waveforms of the calibration circuitry 200 of the converter system of FIG. 1A during mode transition in accordance with an implementation of this description. Similar to FIG. 6, in period 701 of CCM, VREF' 702 is a sum of the reference voltage VREF (which is 0.8V) and the calibration voltage Vca generated based on Vcomp-Vbias during the integration in CCM. Vea_out 702 is increased by the integration through the first capacitor 214 until the average value of feedback voltage VFB reaches the reference voltage VREF. The sampled voltage Vdac 704 increases with increase of Vea_out 702 in a stepwise manner, with a step defined the resolution of DAC 232, and remains around Vea_out 702 within one step when the feedback voltage VFB reaches the reference voltage VREF. In period 703 of PFM, the sampled voltage Vdac sampled in the period 701 is stored in the first capacitor 214. When the converter system 100 switches from PFM back to CCM, the sampled voltage Vdac held by the first capacitor 214 is provided through the switch 220b to the output terminal of the error amplifier 202 to save the transition period in switching from PFM back to CCM. In the period 705, the SAR DAC 228 continues to sample the error amplifier output voltage Vea_out.

Figure 8:
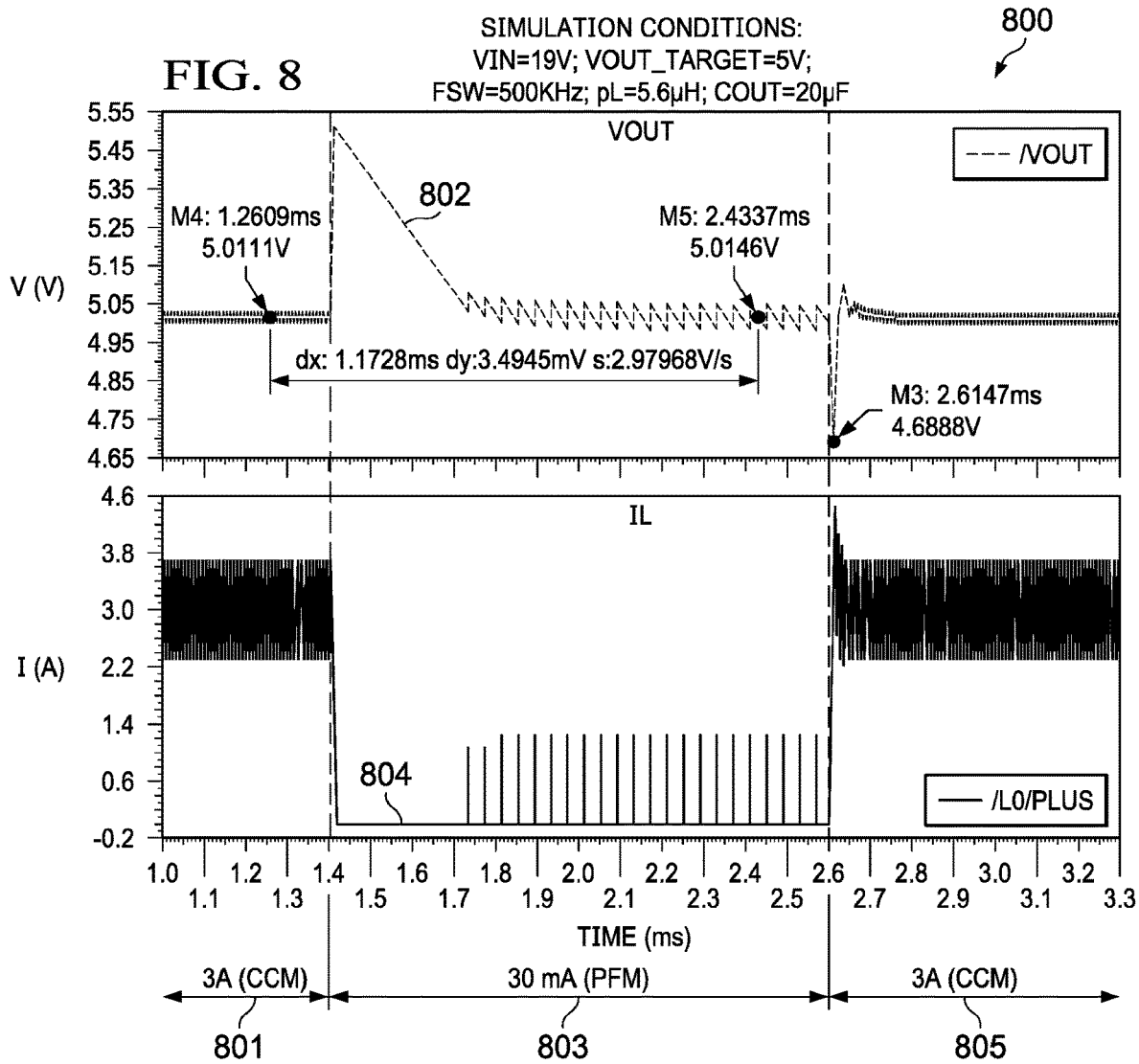
FIG. 8 is a diagram of simulation waveforms of mode transition of the converter system of FIG. 1A in accordance with an implementation of this description.

FIG. 8 is a diagram 800 of simulation waveforms of the converter system 100 of FIG. 1A with a target output voltage 5V and operating between peak-ripple-based continuous conduction mode (CCM) and valley-ripple-based pulse frequency modulation (PFM) mode in accordance with an implementation of this description. The converter system 100 operates: (a) in peak-ripple-based CCM in period 801 with an average inductor current IL 804 of 3A; (b) in valley-ripple-based PFM in period 803 with an average inductor current IL 804 of 30 mA; and (c) back in the peak-ripple-based CCM in period 805. With reference to FIG. 6 described above, by compensating the calibration voltage Vca to the reference voltage VREF, simulation shows that: (a) in the period 801, a difference between an output voltage VOUT 802 of the converter system 100 and the target output voltage 5V is about 0.01V, which is much less than that shown in FIG. 5; and (b) in the period 803, the difference between the output voltage VOUT 802 and the target output voltage 5V is about 0.015V after the transition period, which is also much less than that shown in FIG. 5.

FIG. 9 is a diagram 900 of simulation waveforms converter systems with and without setting integrators of the calibration circuitry 200 of FIG. 2. Similar to FIG. 8, periods 901 and 905 depict peak-ripple-based CCM, and period 903 depict valley-ripple-based PFM. VOUT 902 and IL 904 respectively depict the output voltage and inductor current of the converter system 100 of FIG. 1A. VOUT_NOSET 906 and IL_NOSET 908 respectively depict output voltage and inductor current of a converter without setting integrators of the calibration circuitry 200 of FIG. 2. With reference to FIG. 2 described above, as highlighted in circle 910, after the converter system 100 switches from CCM to PFM, a voltage drop shown in VOUT_NOSET is mitigated in the output voltage VOUT 902 by setting a voltage across the second capacitor 216 with the bias voltage Vbias in CCM. Setting integrators of the calibration circuitry 200 of FIG. 2 allows VOUT 902 to recover faster than VOUT_NOSET 906 during mode transition.

FIG. 10 is a partially enlarged diagram of the diagram 900 of FIG. 9, showing the mode transition from PFM in period 1001 and CCM in period 1003. VOUT 1002 and IL 1004 respectively depict the output voltage and inductor current of the converter system 100 of FIG. 1A. VOUT_NOSET 1006 and IL_NOSET 1008 respectively depict output voltage and inductor current of a converter without setting integrators of the calibration circuitry 200 of FIG. 2. As highlighted in circle 1010, after the converter system 100 switches from PFM back to CCM, a voltage drop shown in VOUT_NOSET caused by valley-ripple-based mode to peak-ripple-based mode transition is avoided in the output voltage VOUT 1002 by setting a voltage a cross the first capacitor 214 with the sampled voltage Vdac in PFM.

In this description, the term "couple" may cover connections, communications, or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C, if intervening component C does not alter the functional relationship between device A and device B, such that device B is controlled by device A via the control signal generated by device A.

Modifications are possible in the described examples, and other examples are possible, within the scope of the claims.

What is claimed is:

1. A method for converting a DC voltage, comprising:
    configuring a switch that is coupled to an inductor to switch between a first state and a second state responsive to a loop control signal;
    configuring calibration circuitry to operate in a first control mode and a second control mode, wherein a calibration voltage is provided in the first control mode, and the calibration voltage is stored in the second control mode, and the calibration voltage is based on a difference between a feedback voltage and a reference voltage;
    configuring a comparator to provide the loop control signal responsive to a combination of the feedback voltage, the reference voltage, the calibration voltage, and a periodic signal;
    configuring logic control circuitry to switch the switch between the first and second states responsive to the loop control signal;
    configuring mode control circuitry to sense an inductor current through the inductor, and provide a mode control signal indicating the first control mode or the second control mode responsive to the inductor current, wherein the periodic signal is a ripple voltage proportional to the inductor current; and
    configuring the calibration circuitry to provide the calibration voltage by integrating the difference between the feedback voltage and the reference voltage;
    wherein the logic control circuitry is coupled to the mode control circuitry and configured to:
        switch the switch, in response to the mode control signal indicating one of the first or second control modes, from the first state to the second state responsive to a peak value of a combination of the feedback voltage and the ripple voltage with reference to a combination of the reference voltage and the calibration voltage; and
        switch the switch, in response to the mode control signal indicating a different one of the first or second control modes, from the second state to the first state responsive to a valley value of the combination of the feedback voltage and the ripple voltage with reference to the combination of the reference voltage and the calibration voltage.

2. The method of claim 1, wherein the calibration circuitry includes:
    an error amplifier having a first input configured to receive the feedback voltage, a second input configured to receive the reference voltage, and an amplifier output configured to provide an error amplifier output voltage;
    first and second capacitors;
    calibration voltage output circuitry coupled to the amplifier output and configured to hold and provide the calibration voltage responsive to a difference between a voltage proportional to the error amplifier output voltage and a bias voltage at a bias voltage terminal; and
    switching circuitry coupled to the mode control circuitry, the first capacitor and the second capacitor, wherein the switching circuitry is configured to receive the mode control signal from the mode control circuitry.

3. The method of claim 2, wherein the bias voltage terminal is a first bias voltage terminal, and the switching circuitry is configured to:
    responsive to the mode control signal indicating the first control mode:
        integrate the difference between the feedback voltage and the reference voltage by coupling the first capacitor between the first input and the amplifier output to provide a first calibration voltage as the calibration voltage; and
        set a voltage across the second capacitor by coupling the second capacitor between the second input and the first bias voltage terminal; and
    responsive to the mode control signal indicating the second control mode:
        set a voltage across the first capacitor by coupling the first capacitor between the second input and a second bias voltage terminal; and
        integrate the difference between the feedback voltage and the reference voltage by coupling the second capacitor between the first input and the amplifier output to provide a second calibration voltage as the calibration voltage.

4. The method of claim 3, wherein:
    the calibration circuitry includes sampling circuitry coupled between the amplifier output and the second bias voltage terminal, wherein the calibration circuitry is configured to sample a voltage at the amplifier output and provide the sampled voltage at the second bias voltage terminal; and
    the switching circuitry is configured to:
        store the sampled voltage from a previous instance of the first control mode on the first capacitor responsive to the mode control signal indicating the second control mode; and
        provide the stored sampled voltage from the first capacitor to the amplifier output responsive to the mode control signal indicating a subsequent instance of the first control mode.

5. The method of claim 4, wherein the comparator is a first comparator, and the sampling circuitry includes:
    a second comparator having a comparator output and first and second comparator inputs, wherein the first comparator input is coupled to the amplifier output;
    a counter having a counter input and digital outputs, wherein the counter input is coupled to the comparator output, and the counter is configured to provide a digital value at the digital outputs, in which the digital value is proportional to the error amplifier output voltage; and
    digital-to-analog circuitry having digital inputs coupled to the digital outputs, and analog outputs coupled to the second comparator input and the second bias voltage terminal.

6. A method for loop control, comprising:
    configuring calibration circuitry to operate in first and second control modes;

providing a calibration voltage in the first control mode, and storing the calibration voltage in the second control mode, wherein the calibration voltage is based on a difference between a feedback voltage and a reference voltage, and the calibration voltage is the stored calibration voltage from the second control mode; and configuring a comparator to provide a loop control signal responsive to a combination of the feedback voltage, the reference voltage, the calibration voltage, and a ripple voltage representative of an inductor current through an inductor;

configuring logic control circuitry to switch between first and second states responsive to the loop control signal;

sensing the inductor current and providing a mode control signal indicating the first control mode or the second control mode responsive to the inductor current; and configuring the calibration circuitry to provide the calibration voltage by integrating the difference between the feedback voltage and the reference voltage;

wherein the logic control circuitry is configured to:
responsive to the mode control signal indicating one of the first or second control modes, switch from the first state to the second state in response to a peak value of a combination of the feedback voltage and the ripple voltage with reference to a combination of the reference voltage and the calibration voltage; and responsive to the mode control signal indicating a different one of the first or second control modes, switch from the second state to the first state in response to a valley value of the combination of the feedback voltage and the ripple voltage with reference to the combination of the reference voltage and the calibration voltage.

7. The method of claim 6, wherein the calibration circuitry includes:
an amplifier having first and second inputs and an amplifier output, wherein the first input is configured to receive the feedback voltage, the second input is configured to receive the reference voltage, and the amplifier is configured to provide an error output voltage at the amplifier output;

first and second capacitors;

calibration voltage output circuitry configured to hold and provide the calibration voltage responsive to a difference between a voltage proportional to the error output voltage and a bias voltage at a bias voltage terminal; and switching circuitry configured to receive the mode control signal.

8. The method of claim 7, wherein the bias voltage terminal is a first bias voltage terminal, and the switching circuitry is configured to:
responsive to the mode control signal indicating the first control mode:
integrate the difference between the feedback voltage and the reference voltage to provide a first calibration voltage as the calibration voltage; and
set a voltage across the second capacitor by coupling the second capacitor between the second input and the first bias voltage terminal; and responsive to the mode control signal indicating the second control mode:
set a voltage across the first capacitor by coupling the first capacitor between the second input and a second bias voltage terminal; and
integrate the difference between the feedback voltage and the reference voltage to provide a second calibration voltage as the calibration voltage.

9. The method of claim 8, wherein:
the calibration circuitry includes sampling circuitry coupled between the amplifier output and the second bias voltage terminal, wherein the calibration circuitry is configured to sample a voltage at the amplifier output and provide the sampled voltage at the second bias voltage terminal; and the switching circuitry is configured to:
store the sampled voltage from a previous instance of the first control mode on the first capacitor responsive to the mode control signal indicating the second control mode; and
provide the stored sampled voltage to the amplifier output responsive to the mode control signal indicating a subsequent instance of the first control mode.

10. The method of claim 9, wherein the comparator is a first comparator, and the sampling circuitry includes:
a second comparator having a comparator output and first and second comparator inputs, wherein the first comparator input is coupled to the amplifier output;

a counter having a counter input and digital outputs, wherein the counter input is coupled to the comparator output, and the counter is configured to provide a digital value at the digital outputs, in which the digital value is proportional to the error output voltage; and digital-to-analog circuitry having digital inputs and analog outputs, wherein the digital inputs are coupled to the digital outputs, and the analog outputs are coupled to the second comparator input and the second bias voltage terminal.

* * * * *